United States Patent
Kataoka

(10) Patent No.: US 8,345,172 B2
(45) Date of Patent: Jan. 1, 2013

(54) VIDEO DISPLAY DEVICE AND LIGHT SOURCE DRIVING METHOD THEREOF

(75) Inventor: Tooru Kataoka, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 308 days.

(21) Appl. No.: 12/733,286

(22) PCT Filed: Oct. 6, 2008

(86) PCT No.: PCT/JP2008/068141
§ 371 (c)(1),
(2), (4) Date: Feb. 22, 2010

(87) PCT Pub. No.: WO2009/044909
PCT Pub. Date: Apr. 9, 2009

(65) Prior Publication Data
US 2010/0149435 A1    Jun. 17, 2010

(30) Foreign Application Priority Data
Oct. 4, 2007   (JP) ................................ 2007-260832

(51) Int. Cl.
*H04N 9/12* (2006.01)
(52) U.S. Cl. ........................................ 348/742; 348/790
(58) Field of Classification Search .......... 348/671–672, 348/744, 742–743, 750–751, 790–791, 739; 345/204, 76–77, 87–88, 99, 102, 207; *H04N 9/12, H04N 3/14*
See application file for complete search history.

(56) References Cited

U.S. PATENT DOCUMENTS

| 6,831,621 | B2 | 12/2004 | Nakano |
| 7,394,448 | B2 * | 7/2008 | Park et al. ..................... 345/102 |
| 2002/0196220 | A1 | 12/2002 | Sato et al. |
| 2003/0020677 | A1 | 1/2003 | Nakano |

(Continued)

FOREIGN PATENT DOCUMENTS

CN    1385830 A    12/2002

(Continued)

OTHER PUBLICATIONS

Chinese Office Action dated Jun. 4, 2012, with English translation.

(Continued)

*Primary Examiner* — Trang U Tran
(74) *Attorney, Agent, or Firm* — McGinn IP Law Group PLLC

(57) ABSTRACT

A display device uses a field sequential color scheme. Assume that a panel video writing period defines a period from the start of writing image data into a display panel to the completion of displaying the image on the basis of the image data in a sub-frame. A light source driving circuit generates a driving signal for gradually increasing the luminance of a light source of a color corresponding to a displayed image in the present sub-frame from zero to a predetermined value within the panel video writing period of the present sub-frame and for gradually decreasing the luminance of the light source from the predetermined value to zero within the panel video writing period of the next sub-frame. A light source driver drives the light source to emit light in accordance with the driving signal.

9 Claims, 16 Drawing Sheets

U.S. PATENT DOCUMENTS

| | | |
|---|---|---|
| 2003/0117364 A1 | 6/2003 | Miyake |
| 2004/0140972 A1* | 7/2004 | Hirota et al. .............. 345/204 |
| 2005/0190170 A1 | 9/2005 | Shin |
| 2006/0114204 A1 | 6/2006 | Sato et al. |
| 2006/0119566 A1 | 6/2006 | Sato et al. |

FOREIGN PATENT DOCUMENTS

| | | |
|---|---|---|
| CN | 1400488 A | 3/2003 |
| CN | 1947429 A | 4/2007 |
| JP | 2000-352701 | 12/2000 |
| JP | 2003-44007 | 2/2003 |
| JP | 2003-195256 | 7/2003 |
| JP | 2003-241714 | 8/2003 |
| JP | 2005-242311 | 9/2005 |
| WO | WO 2007/036870 A1 | 4/2007 |

OTHER PUBLICATIONS

Chinese Office Action dated Sep. 19, 2012, with English translation.

* cited by examiner

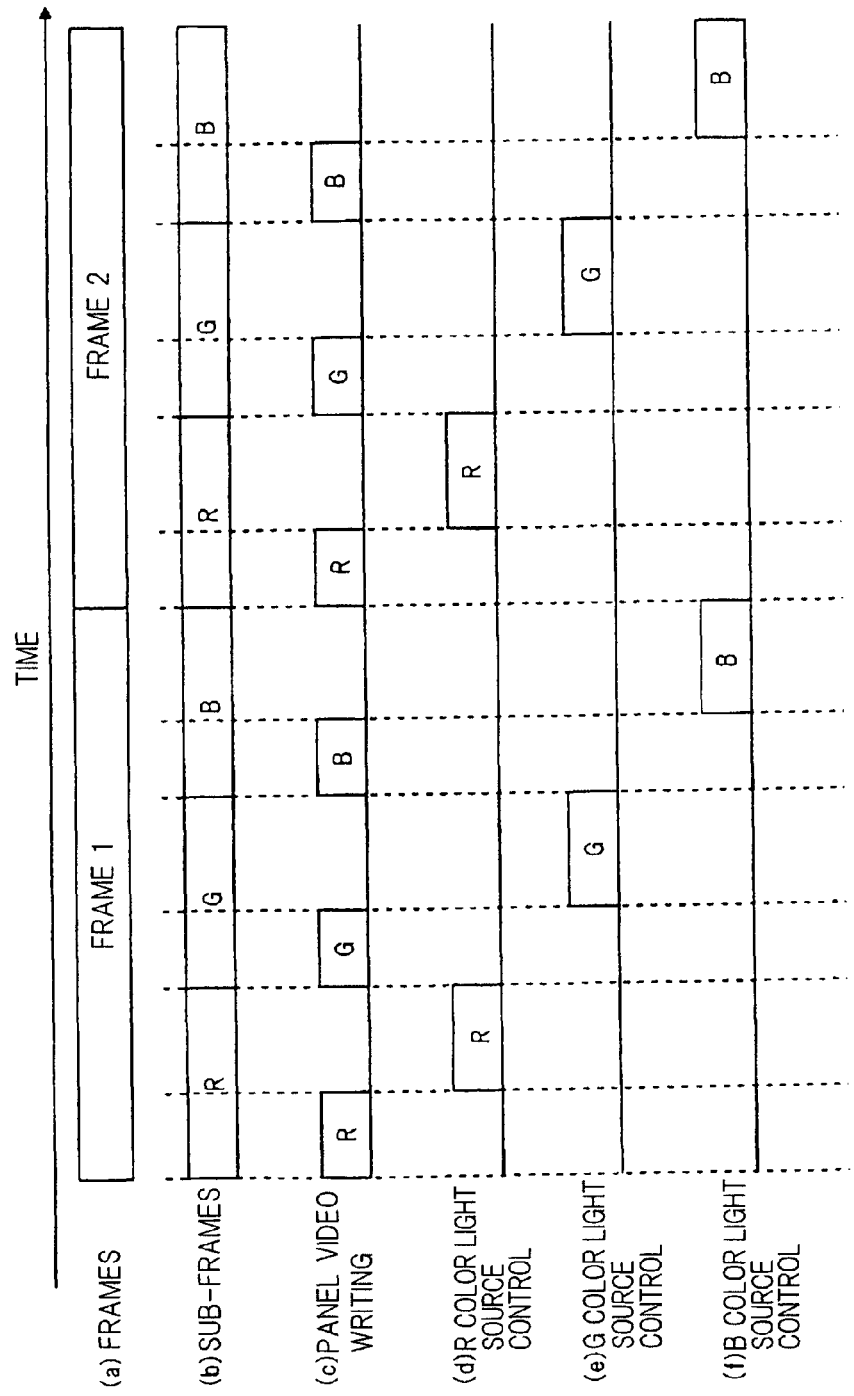

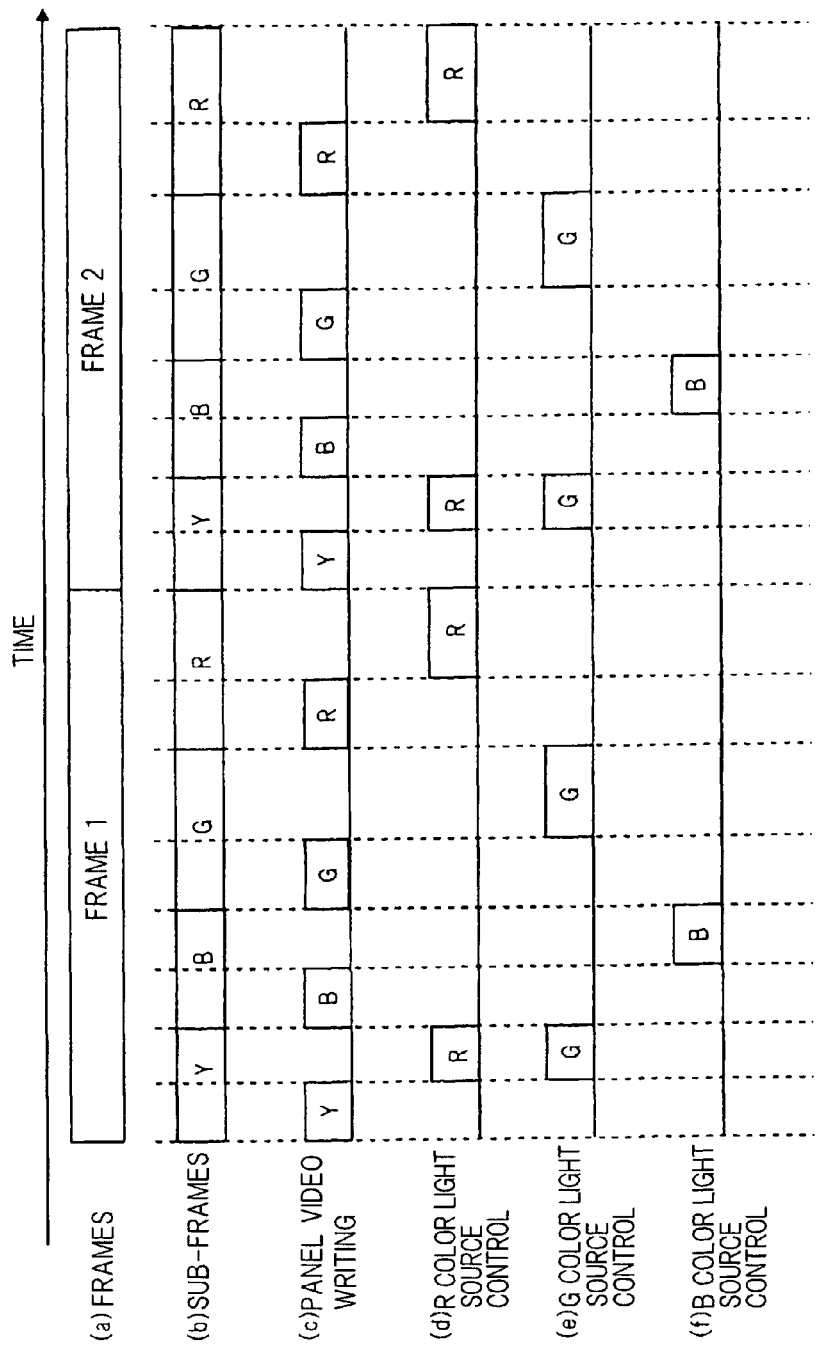
RELATED ART Fig.2-3

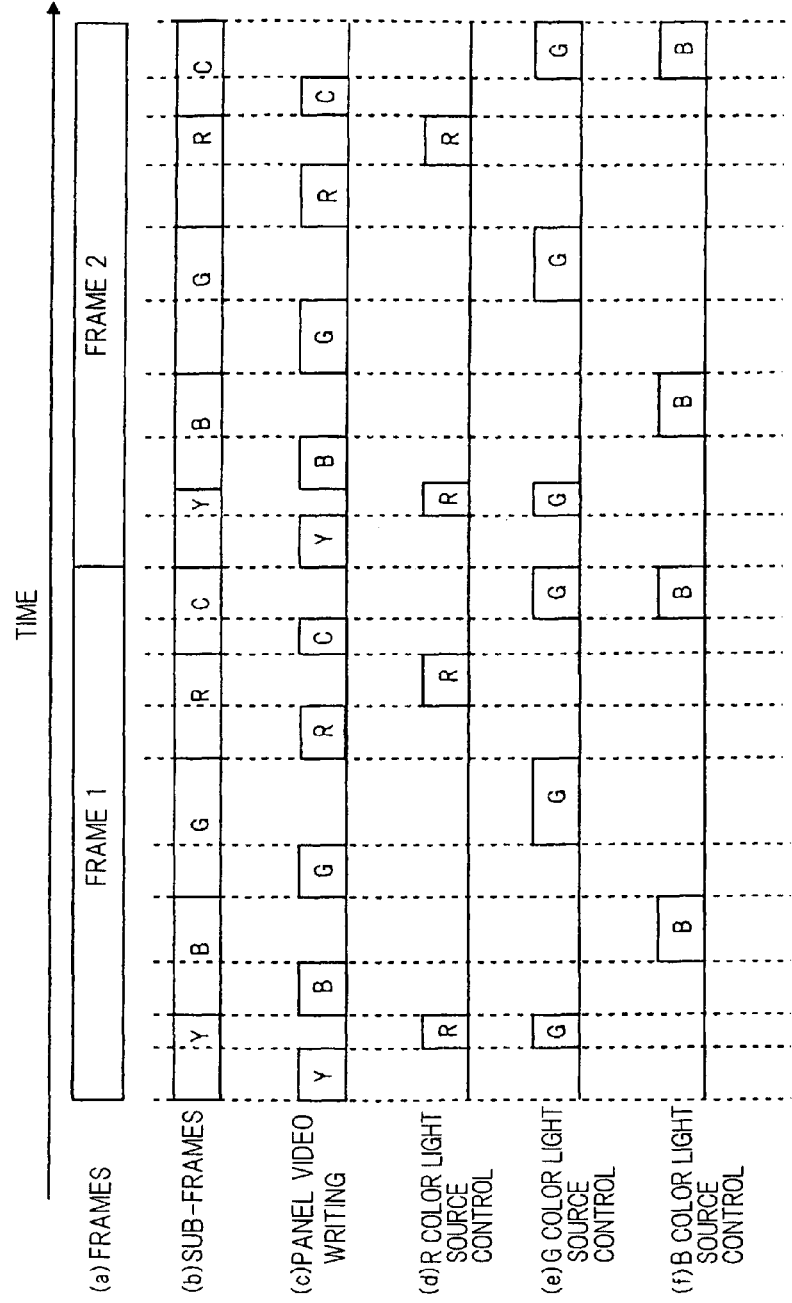
RELATED ART Fig.2-4

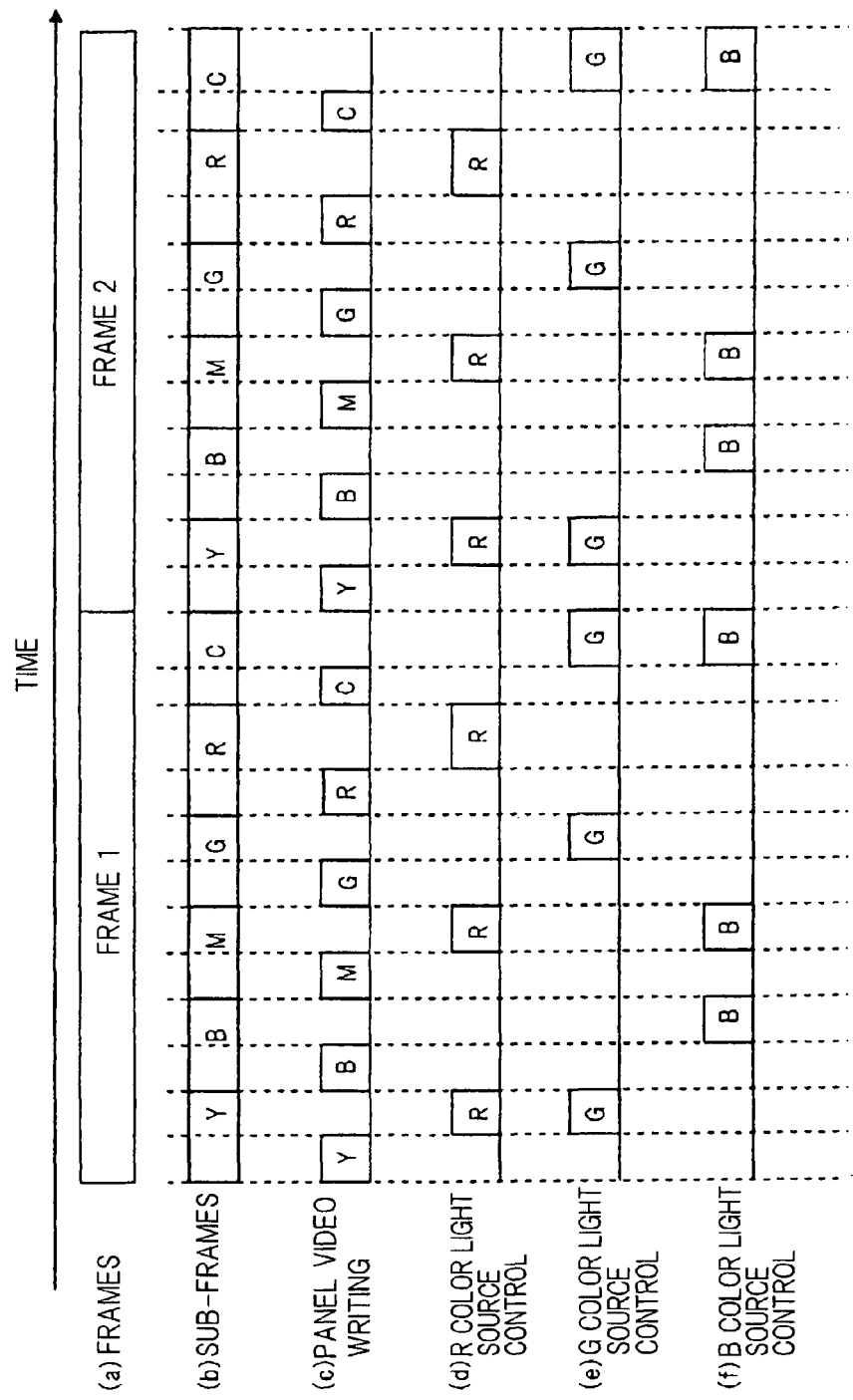

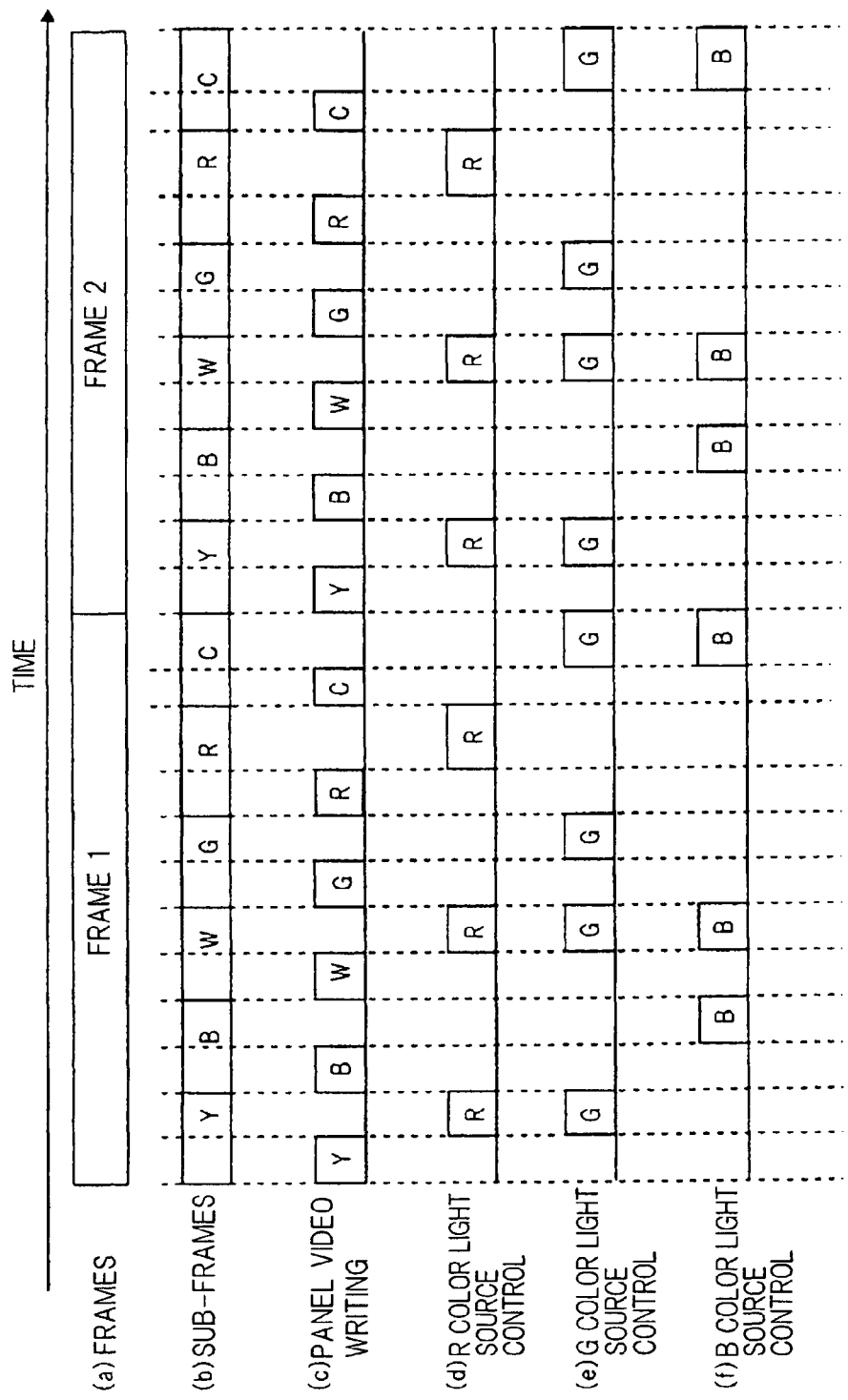
RELATED ART    Fig.2-6

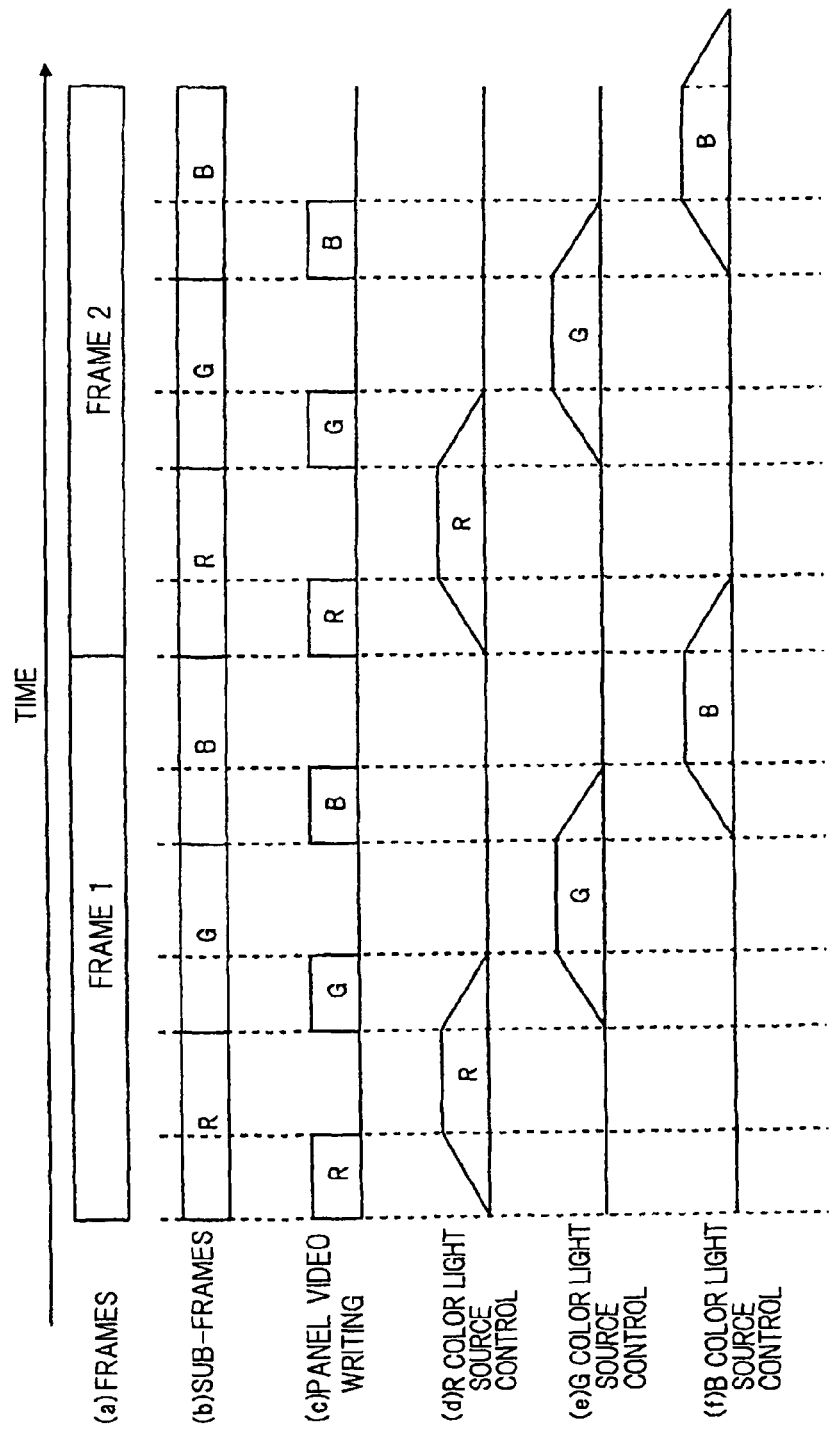

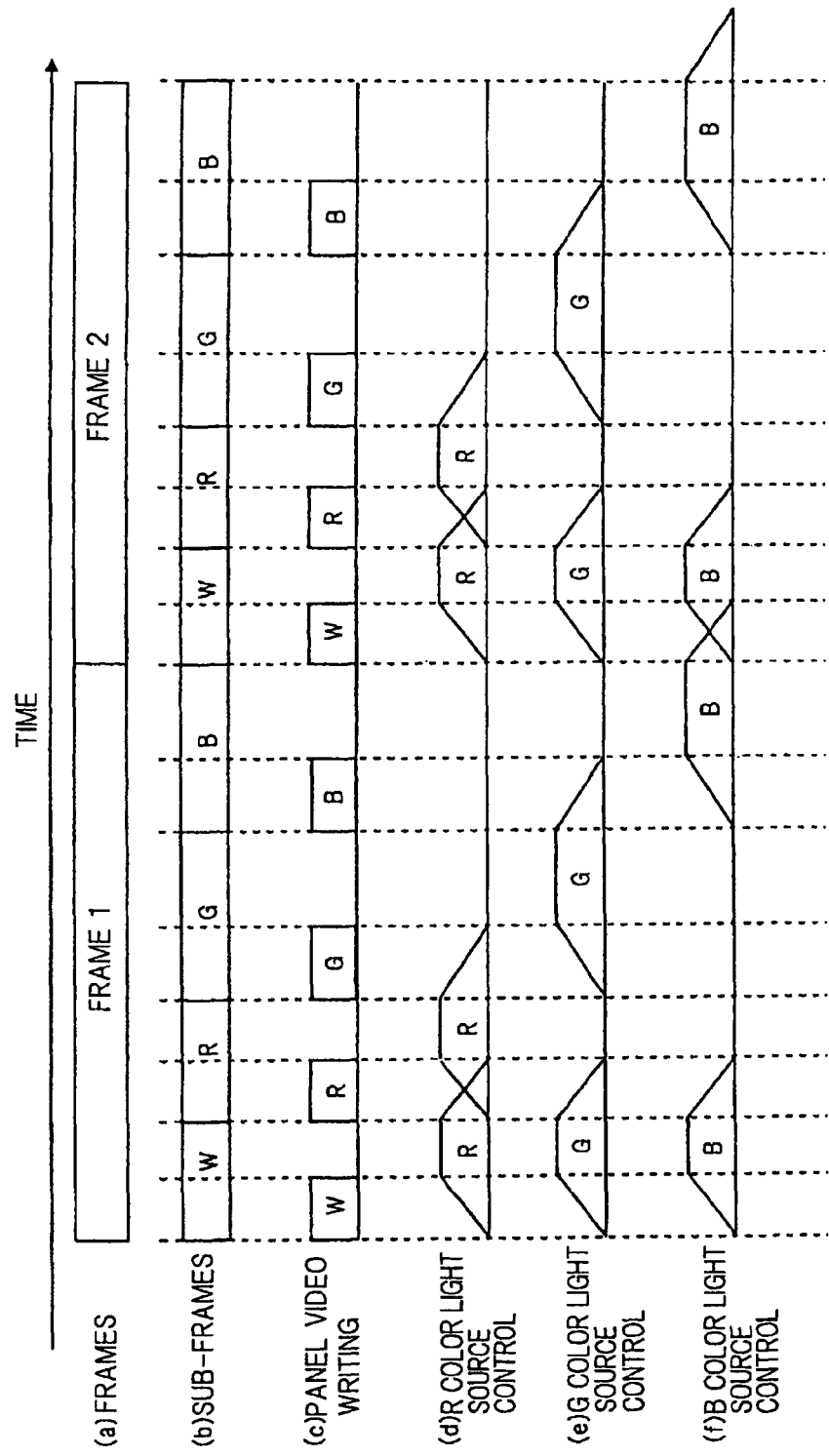

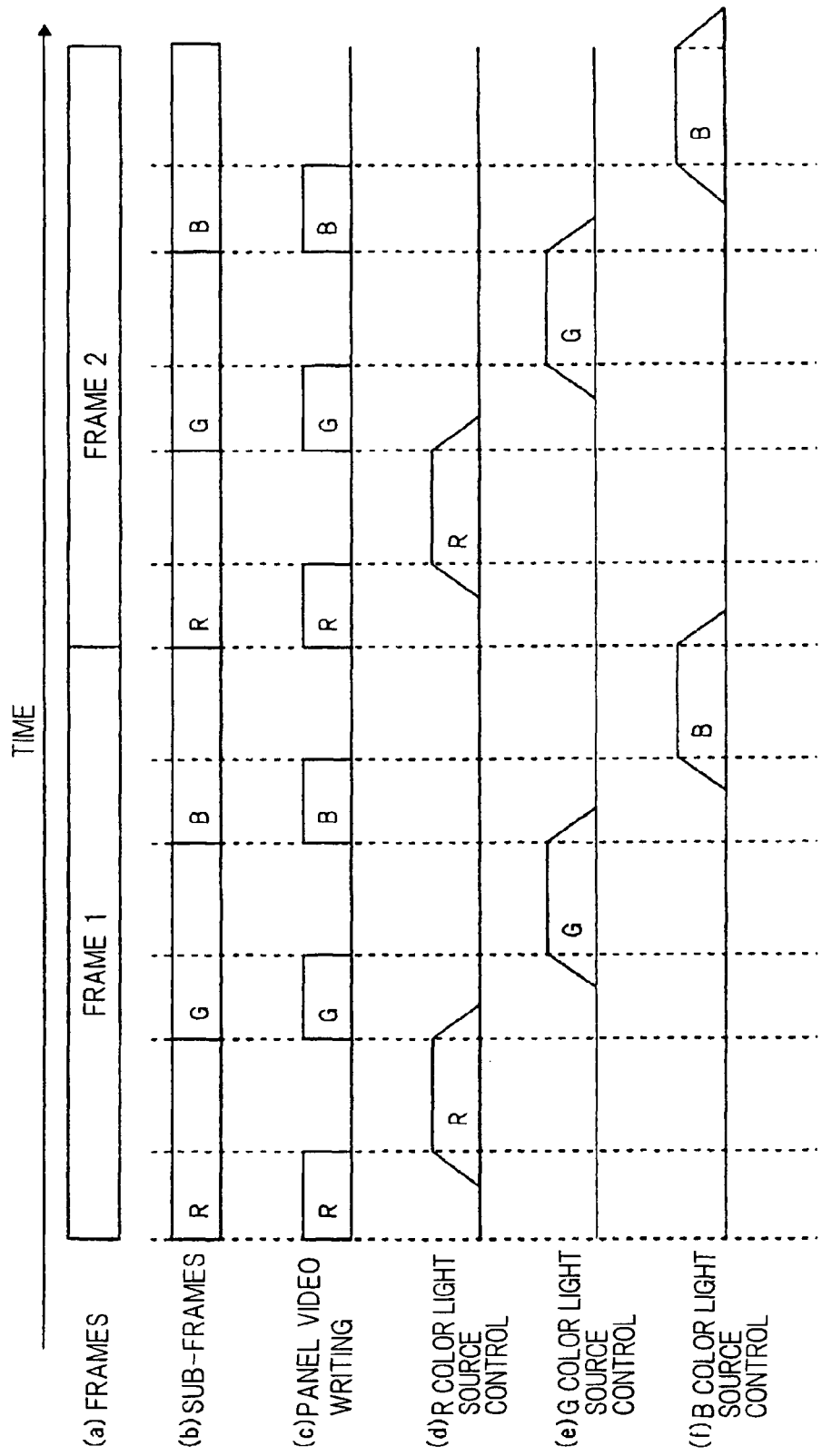

VIDEO DISPLAY DEVICE AND LIGHT SOURCE DRIVING METHOD THEREOF

TECHNICAL FIELD

The present invention relates to a video display device for displaying a moving image in accordance with a field sequential color (FSC) scheme.

BACKGROUND ART

FIG. 1 is a block diagram showing an exemplary configuration of a video display device in conformity with the field sequential color scheme.

The field sequential color scheme refers to a scheme for displaying a color video on a frame-by-frame basis by displaying images corresponding to red (R), green (G), blue (B), or mixed colors comprised of two or more of these colors (for example, yellow (Y), cyan (C), magenta (M), white (W, clear)) on a display panel in an arbitrary order, and sequentially irradiating the display panel with light of colors corresponding to the images to be displayed, from the front or back of the display panel.

As shown in FIG. 1, a video display device of field sequential color scheme comprises video processing circuit 1, scaler circuit 2, LED (light source) driving circuit 3, liquid crystal driving circuit 4, LED (light source) drivers 5-7, LEDs 8-10, panel driver 11, cross dichroic prism 12, liquid crystal panel 13, and projection lens 14.

Video processing circuit 1 performs an A/D conversion of a video signal supplied from the outside, and predetermined video signal processing in conformity with a video standard.

Scaler circuit 2 performs scaling (conversion of resolution through signal interpolation or reduction) for a video signal output from video processing circuit 1 in accordance with the resolution of liquid crystal panel 13 which is used as a display panel.

LED driving circuit 3 generates driving signals for lighting LEDs 8-10, which are light sources of respective colors (red (R), green (G), blue (B)) required to display a color video, which is to be irradiated onto liquid crystal panel 13, in accordance with a video signal output from scaler circuit 2.

LED drivers 5-7 light LEDs 8-10 in red (R), green (G), blue (B) in accordance with the driving signals output from LED driving circuit 3.

Liquid crystal driving circuit 4 generates an image signal for displaying an image corresponding to each color on liquid crystal panel 13 in an arbitrary order in accordance with the video signal output from scaler circuit 2.

Panel driver 11 displays the image corresponding to each color on liquid crystal panel 13 in accordance with the image signal output from liquid crystal driving circuit 4.

Cross dichroic prism 12 irradiates the colors emitted by LEDs 8-10 of red (R), green (G), blue (B), or light of mixed colors comprised of two or more of these colors from the back side of liquid crystal panel 13.

Liquid crystal panel 13, which is, for example, a transmission-type liquid crystal panel, sequentially displays images corresponding to the respective colors in accordance with the image signal output from liquid crystal driving circuit 4.

Projection lens 14 projects a video which has transmitted liquid crystal panel 13 onto screen 15 or the like.

FIGS. 2-1 to 2-6 are timing charts showing exemplary operations of the video display device of field sequential color scheme in the background art. Notably, a method of driving liquid crystal panel 13 and LEDs 8-10 in conformity with the field sequential color scheme, shown in FIGS. 2-1 to 2-6, is also described, for example, in Japanese Laid-Open Patent Application No. 2003-241714A.

FIG. 2-1 is an example where one frame is divided into three sub-frames, images corresponding to respective colors of one frame are displayed on liquid crystal panel 13 in the order of red (R), green (G), and blue (B) in the three sub-frames, and LEDs 8-10 corresponding to the colors on the displayed images are sequentially lit to display a color image.

In the example shown in FIG. 2-1, red (R) image data is written into liquid crystal panel 13 by liquid crystal driving circuit 4 in the first sub-frame of one frame, and after the completion of displaying an image by liquid crystal panel 13, red (R) LED 8 is lit by LED driving circuit 3 at an appropriate luminance in accordance with a gradation level of the displayed image.

Similarly, green (G) image data is written into liquid crystal panel 13 by liquid crystal driving circuit 4 in the second sub-frame of the one frame, and after completion of displaying an image by liquid crystal panel 13, green (G) LED 9 is lit by LED driving circuit 3 at an appropriate luminance in accordance with a gradation level of the displayed image.

Further, blue (B) image data is written into liquid crystal panel 13 by liquid crystal driving circuit 4 in the last sub-frame of the one frame, and after the completion of displaying an image by liquid crystal panel 13, blue (B) LED 10 is lit by LED driving circuit 3 at an appropriate luminance in accordance with a gradation level of the displayed image.

Generally, in liquid crystal panel 13, a certain period of time is taken from the time image data to be displayed is written into TFTs (Thin Film Transistor), not shown, arrayed on a pixel-by-pixel basis to the time that an image is actually displayed on the basis of the image data. A "panel video writing" period shown in (c) of FIGS. 2-1 to 2-6 is a period of time which has been previously set in consideration of a period of time which is taken from the start of writing of image data into TFTs to the completion of displaying the image.

FIG. 2-2 is an example where one frame is divided into four sub-frames, images corresponding to respective colors of one frame are displayed on liquid crystal panel 13 in the order of white (W, clear), red (R), green (G), and blue (B) in the four sub-frames, and LEDs 8-10 corresponding to the colors on the displayed images are sequentially lit to display a color image. The illumination of white (W, clear) is achieved by simultaneously lighting LEDs 8-10 of red (R), green (G), and blue (B) and combining the illumination light with cross dichroic prism 12.

Operations of liquid crystal driving circuit 4 and LED driving circuit 3 in each sub-frame are similar to those in the example shown in FIG. 2-1 except that a different LED should be lit. Accordingly, a description thereon is herein omitted. The same applies to exemplary operations shown later in FIGS. 2-3 to 2-6 as well.

FIG. 2-3 is an example where one frame is divided into four sub-frames, images corresponding to respective colors of one frame are displayed on liquid crystal panel 13 in the order of yellow (Y), blue (B), green (G), and red (R) in the four sub-frames, and LEDs 8-10 corresponding to the colors on the displayed images are sequentially lit to display a color image. The illumination of yellow (Y) is achieved by simultaneously lighting LEDs 8, 9 of red (R) and green (G) and combining the illumination light with cross dichroic prism 12.

FIG. 2-4 is an example where one frame is divided into five sub-frames, images corresponding to respective colors of one frame are displayed on liquid crystal panel 13 in the order of yellow (Y), blue (B), green (G), red (R), and cyan (C) in the five sub-frames, and LEDs 8-10 corresponding to the colors on the displayed images are sequentially lit to display a color image. The illumination of cyan (C) is achieved by simultaneously lighting LEDs 9, 10 of green (G) and blue (B), and combining the illumination light with cross dichroic prism 12.

FIG. 2-5 is an example where one frame is divided into six sub-frames, images corresponding to respective colors of one frame are displayed on liquid crystal panel 13 in the order of yellow (Y), blue (B), magenta (M), green (G), red (R), and cyan (C) in the six sub-frames, and LEDs 8-10 corresponding to the colors on the displayed images are sequentially lit to display a color image. The illumination of magenta (M) is achieved by simultaneously lighting LEDs 8, 10 of red (R) and blue (B), and combining the illumination light with cross dichroic prism 12.

FIG. 2-6 is an example where one frame is divided into six sub-frames, images corresponding to respective colors of one frame are displayed on liquid crystal panel 13 in the order of yellow (Y), blue (B), white (W, clear), green (G), red (R), and cyan (C) in the six sub-frames, and LEDs 8-10 corresponding to the colors on the displayed images are sequentially lit to display a color image.

In the field sequential color scheme, one frame is divided into a plurality of sub-frames, and images of red (R), green (G), blue (B), or mixed colors comprised of two or more of these colors are sequentially displayed to display a color image, taking advantage of the persistence of human's vision. As such, a video display device of field sequential color scheme is known to suffer from flicker, color breakup and the like on a video displayed on a screen or the like.

In order to suppress flicker to such a degree that a person does not feel discomfort, for example, even in a three-plate configuration which comprises three liquid crystal panels for red (R), green (G), and blue (B), it is necessary to set a refresh rate, which is a screen rewriting speed, to 60 Hz or higher at a minimum. For this reason, in a single plate configuration which employs a single liquid crystal panel, as shown in FIG. 1, the refresh rate is required to be 180 Hz or higher, i.e., at least three times higher than the 60 Hz rate.

Conventional video display devices of field sequential color scheme have addressed such problems as flicker, color breakup and the like by increasing the number of sub-frames which make up one frame, and increasing the refresh rate. Specifically, problems such as flicker, color breakup and the like have been addressed by using LEDs or laser light, which can be turned on/off at high speeds, as a light source, or by using a DMD (Digital Micro-mirror Deice), which can be driven at a refresh rate higher than that of a liquid crystal panel, as a display panel.

However, since DMD is generally expensive, a liquid crystal panel is preferably employed for a display panel in order to restrain an increase in the cost of a video display device. However, current liquid crystal panels can respond at a speed of approximately 1.5 ms at most, when an image is displayed in the sequence of white, black, and white, and therefore require one horizontal scanning period of at least approximately 2 μs in consideration of a through rate of a panel driver, and a time taken to write image data into TFTs (Thin Film Transistor) which form part of the liquid crystal panel. Consequently, the number of sub-frames in one frame is limited to approximately six at present.

Also, since the panel driver is restricted in operation frequency to an upper limit value of approximately 150 MHz, the number of sub-frames making up one frame is also limited from this viewpoint.

Accordingly, a novel approach is needed, other than increasing the refresh rate, in order to reduce color breakup to further improve the image quality of videos displayed on a screen or the like.

SUMMARY

It is therefore an object of the present invention to provide a video display device that uses field sequential color scheme and a light source driving method therefor which are capable of reducing color breakup of a video displayed on a screen or the like to improve the image quality without increasing the refresh rate.

In an aspect of the present invention for achieving the above-described object, a video display device of the present invention is a video display device that uses a field sequential color scheme which comprises:

a plurality of light sources for emitting light of a plurality of colors required to display a color video;

a display panel for sequentially displaying a plurality of images corresponding to the colors in a plurality of sub-frames which make up one frame based on a video signal;

a light source driving circuit for generating a driving signal for lighting a light source of a color corresponding to a displayed image on a per-sub-frame basis, so as to gradually increase the luminance of the light source of the color corresponding to the displayed image of a current sub-frame from zero to a predetermined value within a panel video writing period of the current sub-frame, where the panel video writing period defines a period from the start of image data writing into the display panel to the completion of displaying an image based on the image data in the sub-frame, and so as to gradually decrease the luminance of the light source of the color corresponding to the displayed image of the current sub-frame from the predetermined value to zero within the panel video writing period of the next sub-frame; and a light source driver for driving the light sources to emit light in accordance with the driving signal.

On the other hand, a light source driving method of the present invention is a light source driving method for driving light sources to emit light in a video display device using a field sequential color scheme which comprises:

a plurality of the light sources for emitting light of a plurality of colors required to display a color video;

a display panel for sequentially displaying a plurality of images corresponding to the colors in a plurality of sub-frames which make up one frame based on a video signal;

a light source driving circuit for generating a driving signal for lighting a light source of a color corresponding to a displayed image on a per-sub-frame basis; and a light source driver for driving the light sources to emit light in accordance with the driving signal, wherein when a panel video writing period defines a period from the start of image data writing into the display panel to the completion of displaying an image based on the image data in the sub-frame, the light source driving circuit generates a driving signal for gradually increasing the luminance of a light source of a color corresponding to a displayed image of a current sub-frame from zero to a predetermined value within the panel video writing period of the current sub-frame, and for gradually decreasing the luminance of the light source of the color corresponding to the displayed image of the current sub-frame from the predetermined value to zero within the panel video writing period of the next sub-frame; and the light source driver drives the light source to emit light in accordance with the driving signal.

BRIEF DESCRIPTION OF THE DRAWINGS

FIG. 1 is a block diagram showing an exemplary configuration of a video display device using field sequential color scheme.

[FIG. 2-1]
FIG. 2-1 is a timing chart showing an exemplary operation of the video display device in accordance with the field sequential color scheme in the background art.

[FIG. 2-2]
FIG. 2-2 is a timing chart showing an exemplary operation of the video display device in accordance with the field sequential color scheme in the background art.

[FIG. 2-3]
FIG. 2-3 is a timing chart showing an exemplary operation of the video display device in accordance with the field sequential color scheme in the background art.

[FIG. 2-4]
FIG. 2-4 is a timing chart showing an exemplary operation of the video display device in accordance with the field sequential color scheme in the background art.

[FIG. 2-5]
FIG. 2-5 is a timing chart showing an exemplary operation of the video display device in accordance with the field sequential color scheme in the background art in the background art.

[FIG. 2-6]
FIG. 2-6 is a timing chart showing an exemplary operation of the video display device in accordance with the field sequential color scheme in the background art.

[FIG. 3-1]
FIG. 3-1 is a timing chart showing an exemplary operation of a video display device in accordance with a field sequential color scheme in one embodiment.

[FIG. 3-2]
FIG. 3-2 is a timing chart showing an exemplary operation of the video display device in accordance with the field sequential color scheme in one embodiment.

[FIG. 3-3]
FIG. 3-3 is a timing chart showing an exemplary operation of the video display device in accordance with the field sequential color scheme in one embodiment.

[FIG. 3-4]
FIG. 3-4 is a timing chart showing an exemplary operation of the video display device in accordance with the field sequential color scheme in one embodiment.

[FIG. 3-5]
FIG. 3-5 is a timing chart showing an exemplary operation of the video display device in accordance with the field sequential color scheme in one embodiment.

[FIG. 3-6]
FIG. 3-6 is a timing chart showing an exemplary operation of the video display device in accordance with the field sequential color scheme in one embodiment.

[FIG. 3-7]
FIG. 3-7 is a timing chart showing an exemplary operation of the video display device in accordance with the field sequential color scheme in one embodiment.

[FIG. 4]
FIG. 4 is a circuit diagram showing an exemplary configuration of an LED driving circuit and an LED driver included in the video display device of one embodiment.

[FIG. 5]
FIG. 5 is a circuit diagram showing an exemplary configuration of an LED driving circuit and an LED driver included in the video display device of one embodiment.

EXEMPLARY EMBODIMENT

Next, the present invention will be described with reference to the drawings.

A video display device of the present invention comprises LED (light source) driving circuit 3 for generating a driving signal for gradually increasing the luminance of a light source of a color corresponding to an image to be displayed in a current sub-frame from zero to a predetermined value within a panel video writing period of the current sub-frame, and for gradually decreasing the luminance of the light source of the color corresponding to the image to be displayed in the current sub-frame from the predetermined value to zero within a panel video writing period of the next sub-frame.

Figure 1:
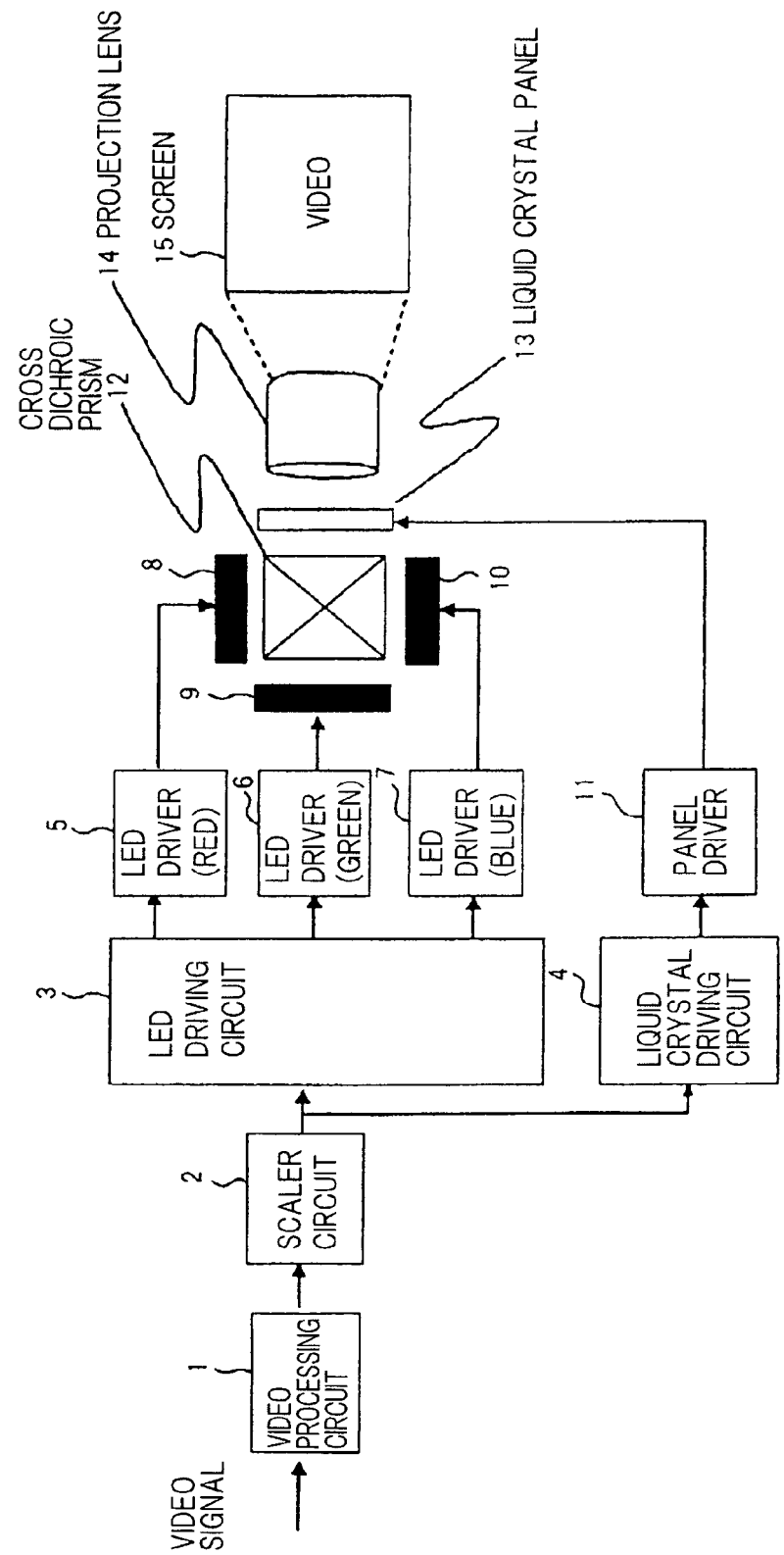
[FIG. 1]

LED driving circuit 3 of this embodiment comprises a function of controlling the luminance of LEDs 8-10 of red (R), green (G), and blue (B) by controlling the level, pulse width and the like of driving signals supplied to LED (light source) drivers 5-7 shown in FIG. 1. Since the remaining configuration and operations involved in the video display device are similar to the background art shown in FIG. 1, descriptions thereon are omitted.

FIGS. 3-1 to 3-7 are timing charts showing exemplary operations of the video display device using field sequential color scheme according to this embodiment.

Figure 3:
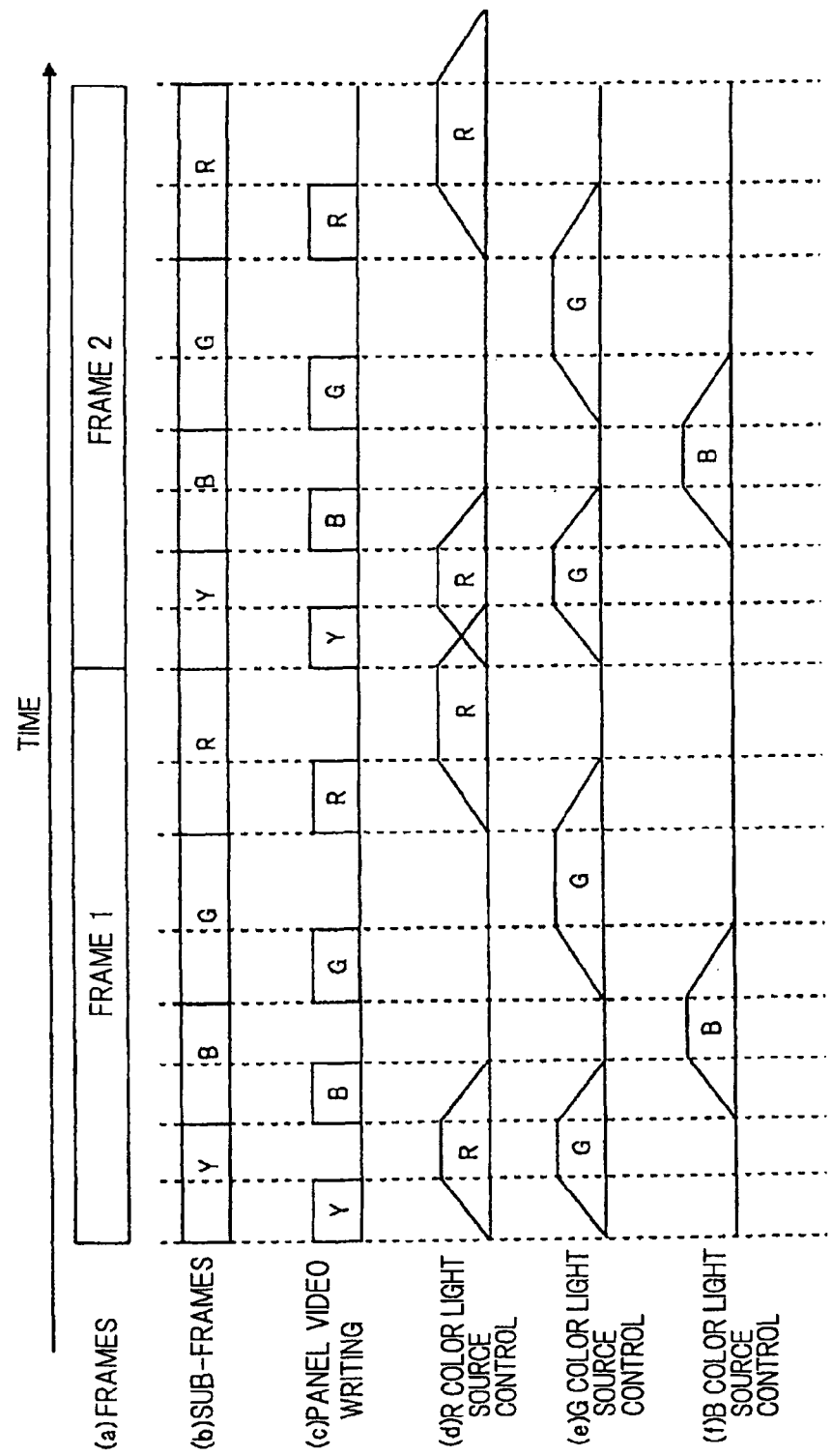

FIG. 3-1 is an example where one frame is divided into three sub-frames, an image corresponding to each color of one frame is displayed on liquid crystal panel 13 in the order of red (R), green (G), and blue (B) in the three sub-frames, and LEDs corresponding to the colors in an image to be displayed are sequentially lit to display a color image.

In the example shown in FIG. 3-1, image data of red (R) is written into liquid crystal panel 13 by liquid crystal driving circuit 4 in the first sub-frame of one frame, and LED driving circuit 3 lights red (R) LED 8 simultaneously with the start of the image data writing, and gradually increases the luminance of red (R) LED 8 such that an optimal luminance (predetermined value) is reached in accordance with a gradation level of a displayed image at the time a corresponding panel video writing period ends. On the other hand, for extinguishing red (R) LED 8, LED driving circuit 3 starts decreasing the luminance of red (R) LED 8 simultaneously with the start of image data writing in the next sub-frame (second sub-frame), and gradually decreases the luminance such that red (R) LED 8 is extinguished at the time a corresponding panel video writing period ends.

Similarly, image data of green (G) is written into liquid crystal panel 13 by liquid crystal driving circuit 4 in the second sub-frame of the one frame, and LED driving circuit 3 lights green (G) LED 9 simultaneously with the start of the image data writing, and gradually increases the luminance of green (G) LED 9 such that an optimal luminance (predetermined value) is reached in accordance with a gradation level of a displayed image at the time a corresponding panel video writing period ends. On the other hand, for extinguishing green (G) LED 9, LED driving circuit 3 starts decreasing the luminance of green (G) LED 9 simultaneously with the start of image data writing in the next sub-frame (third sub-frame), and gradually decreases the luminance such that green (G) LED 9 is extinguished at the time a corresponding panel video writing period ends.

Further, image data of blue (B) is written into liquid crystal panel 13 by liquid crystal driving circuit 4 in the third sub-frame of the one frame, and LED driving circuit 3 lights blue (B) LED 10 simultaneously with the start of the image data writing, and gradually increases the luminance of blue (B) LED 10 such that an optimal luminance (predetermined value) is reached in accordance with a gradation level of a displayed image at the time a corresponding panel video writing period ends. On the other hand, for extinguishing blue (B) LED 10, LED driving circuit 3 starts decreasing the luminance of blue (B) LED 10 simultaneously with the start of image data writing in the next sub-frame (the first sub-frame in the next frame), and gradually decreases the luminance such that blue (B) LED 10 is extinguished at the time a corresponding panel video writing period ends.

Figure 2:
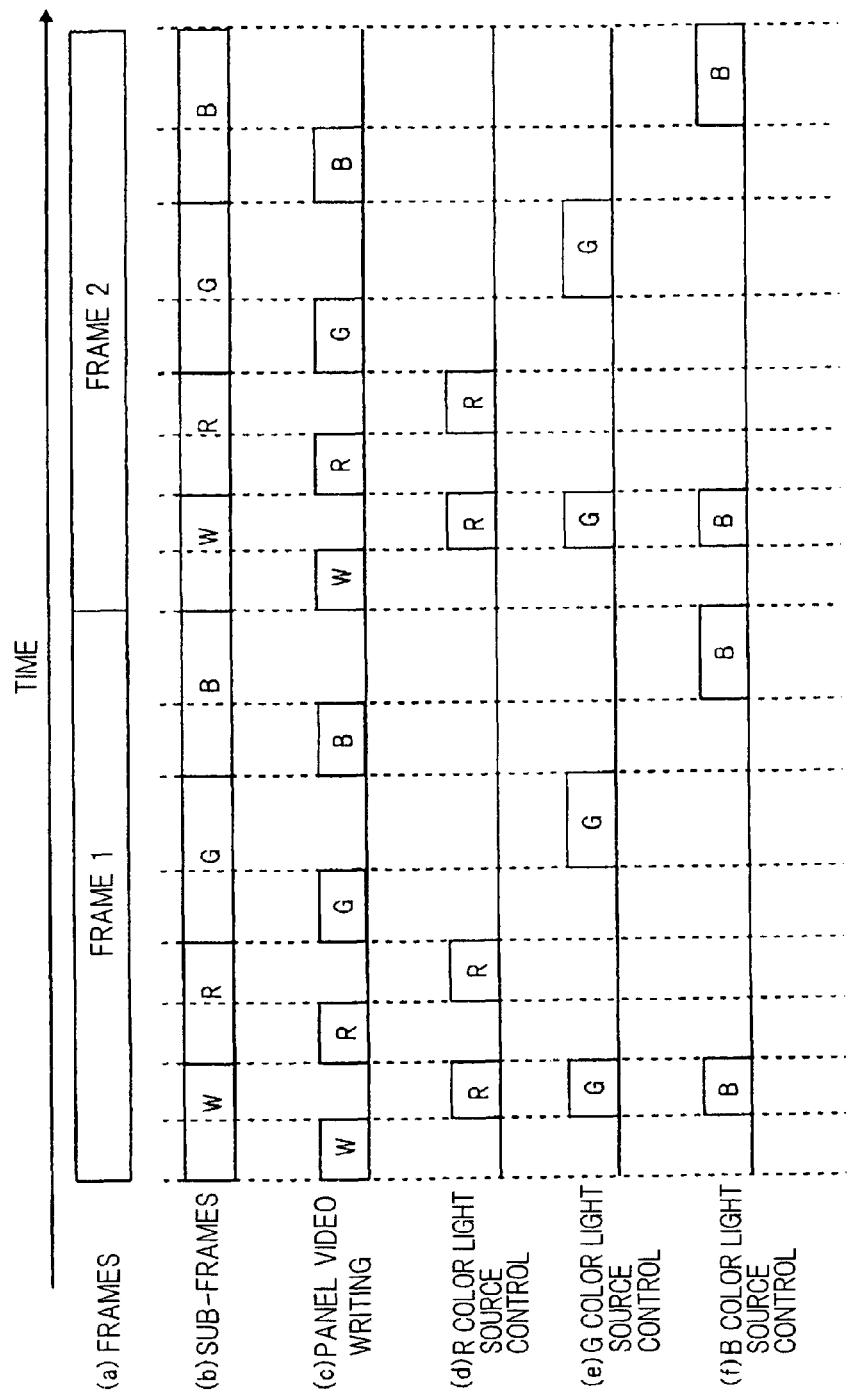

FIG. 3-2 is an example where one frame is divided into four sub-frames, images corresponding to respective colors of one frame are displayed on liquid crystal panel 13 in the order of white (W, clear), red (R), green (G), and blue (B) in the four sub-frames, and the LEDs corresponding to the colors on the displayed images are sequentially lit to display a color image. The illumination of white (W or clear) is achieved by simultaneously lighting LEDs 8-10 of red (R), green (G), and blue (B) and combining the illumination light with cross dichroic prism 12.

Operations of liquid crystal driving circuit 4 and LED driving circuit 3 in each sub-frame are similar to those in the example shown in FIG. 3-1 except that a different LED should be lit. Accordingly, a description thereon is herein omitted. The same applies to exemplary operations shown later in FIGS. 3-3 to 3-6 as well.

FIG. 3-3 is an example where one frame is divided into four sub-frames, images corresponding to respective colors of one frame are displayed on liquid crystal panel 13 in the order of yellow (Y), blue (B), green (G), and red (R) in the four sub-frames, and the LEDs corresponding to the colors on the displayed images are sequentially lit to display a color image. The illumination of yellow (Y) is achieved by simultaneously lighting LEDs 8, 9 of red (R) and green (G) and combining the illumination light with cross dichroic prism 12.

Figures 3, 4:
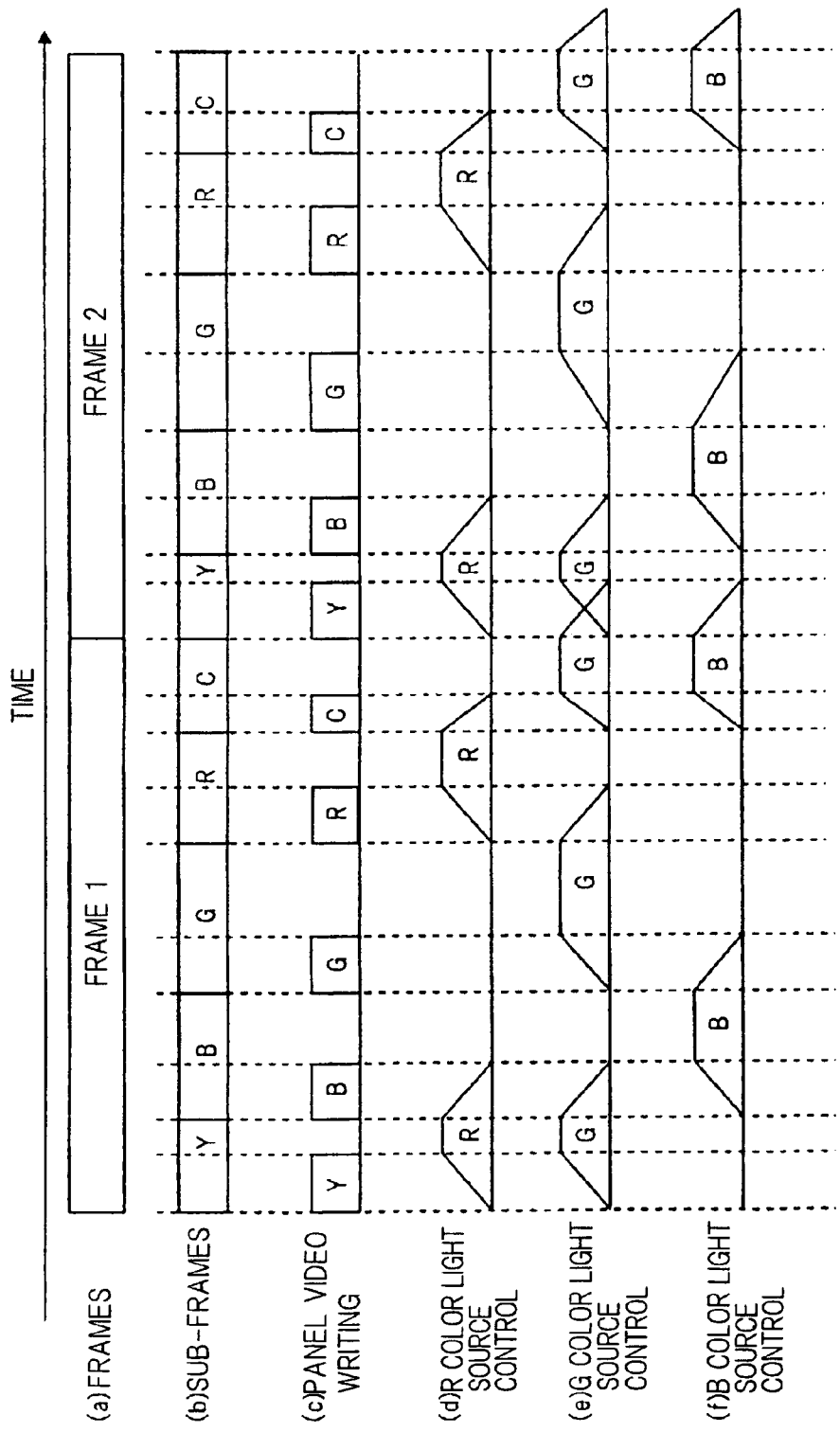

FIG. 3-4 is an example where one frame is divided into five sub-frames, images corresponding to respective colors of one frame are displayed on liquid crystal panel 13 in the order of yellow (Y), blue (B), green (G), red (R), and cyan (C) in the five sub-frames, and the LEDs corresponding to the colors on the displayed images are sequentially lit to display a color image. The illumination of cyan (C) is achieved by simultaneously lighting LEDs 9, 10 of green (G) and blue (B), and combining the illumination light with cross dichroic prism 12.

Figures 3, 4, 5:
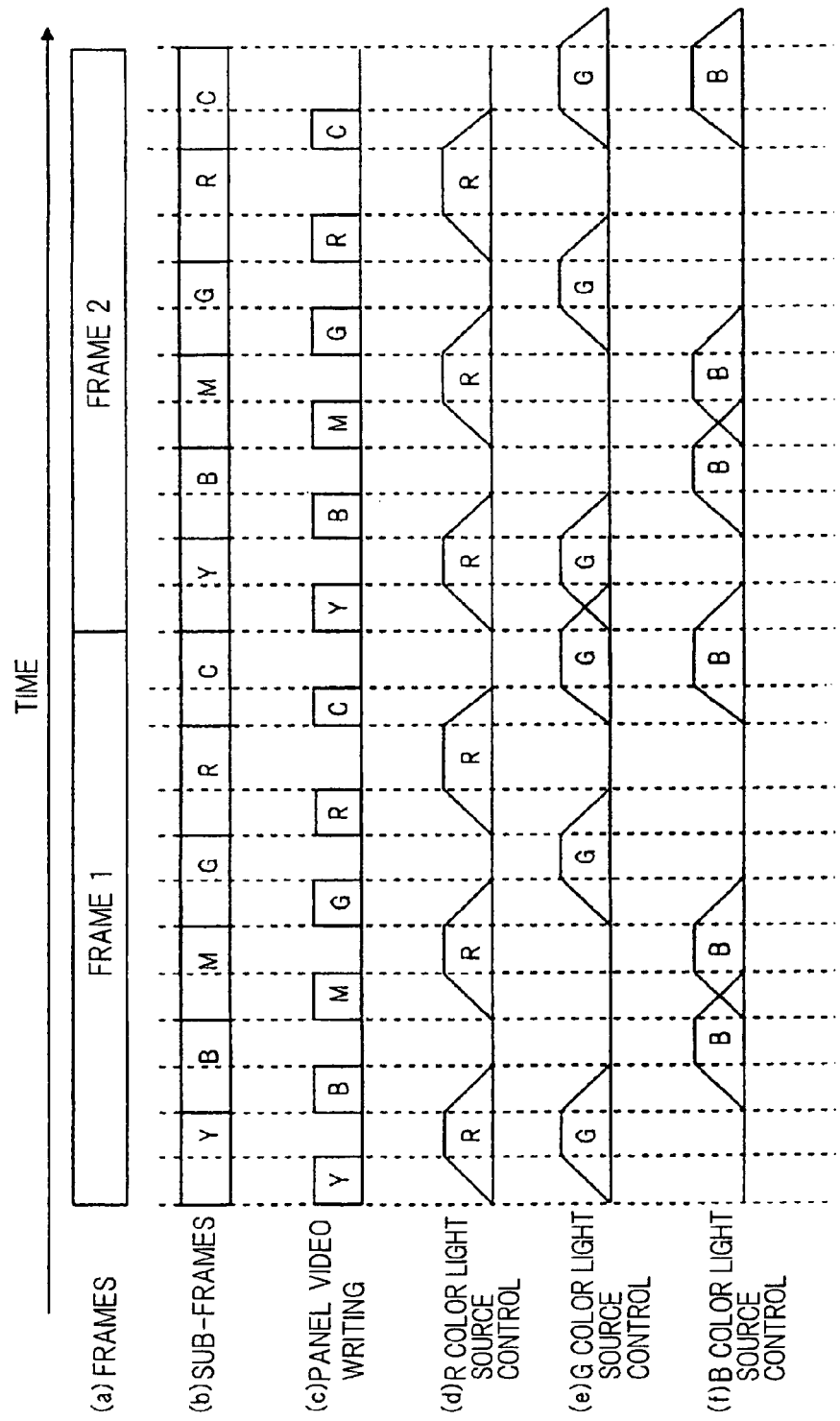
Figures 3, 4, 5, 6:
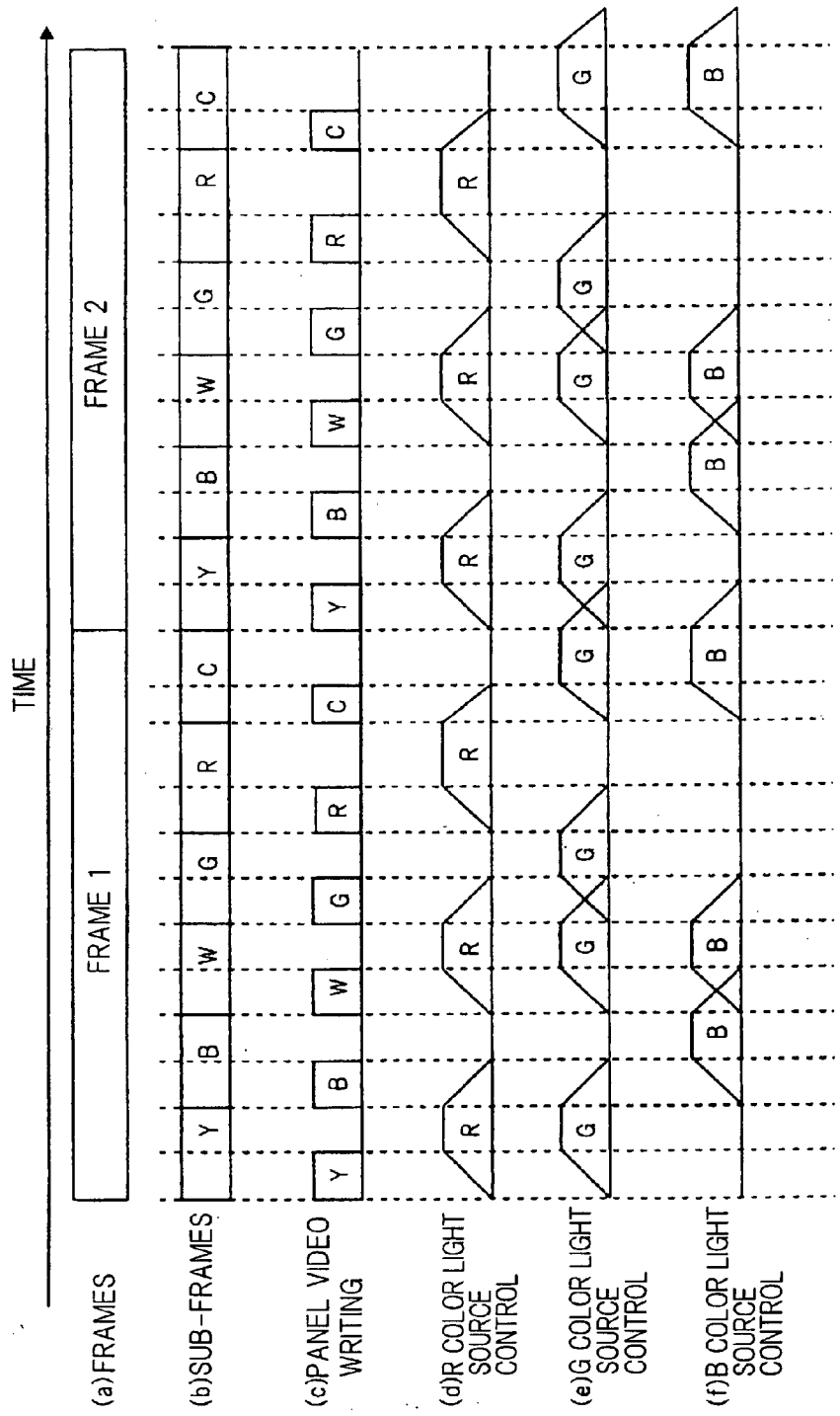
Figure 4:
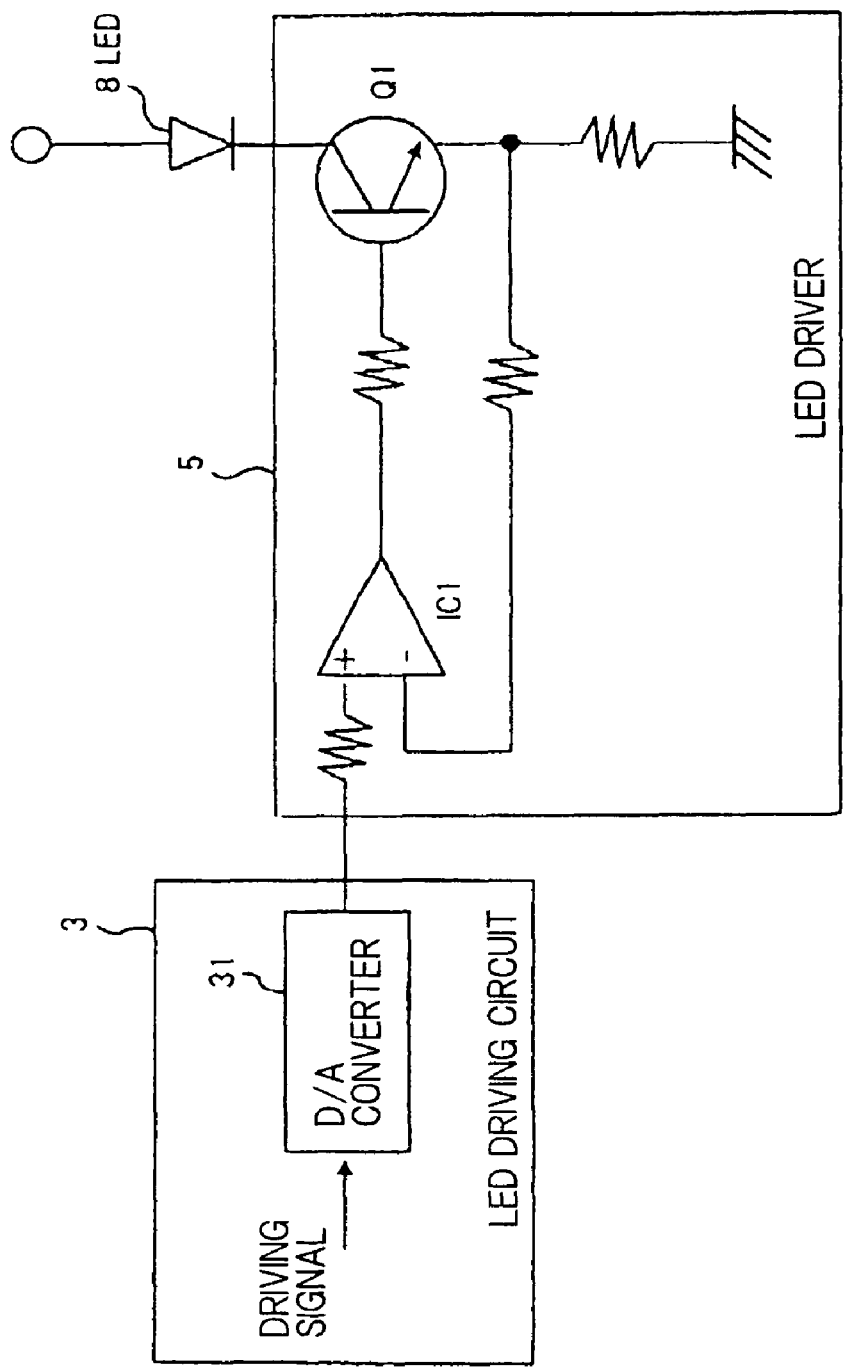
Figure 5:
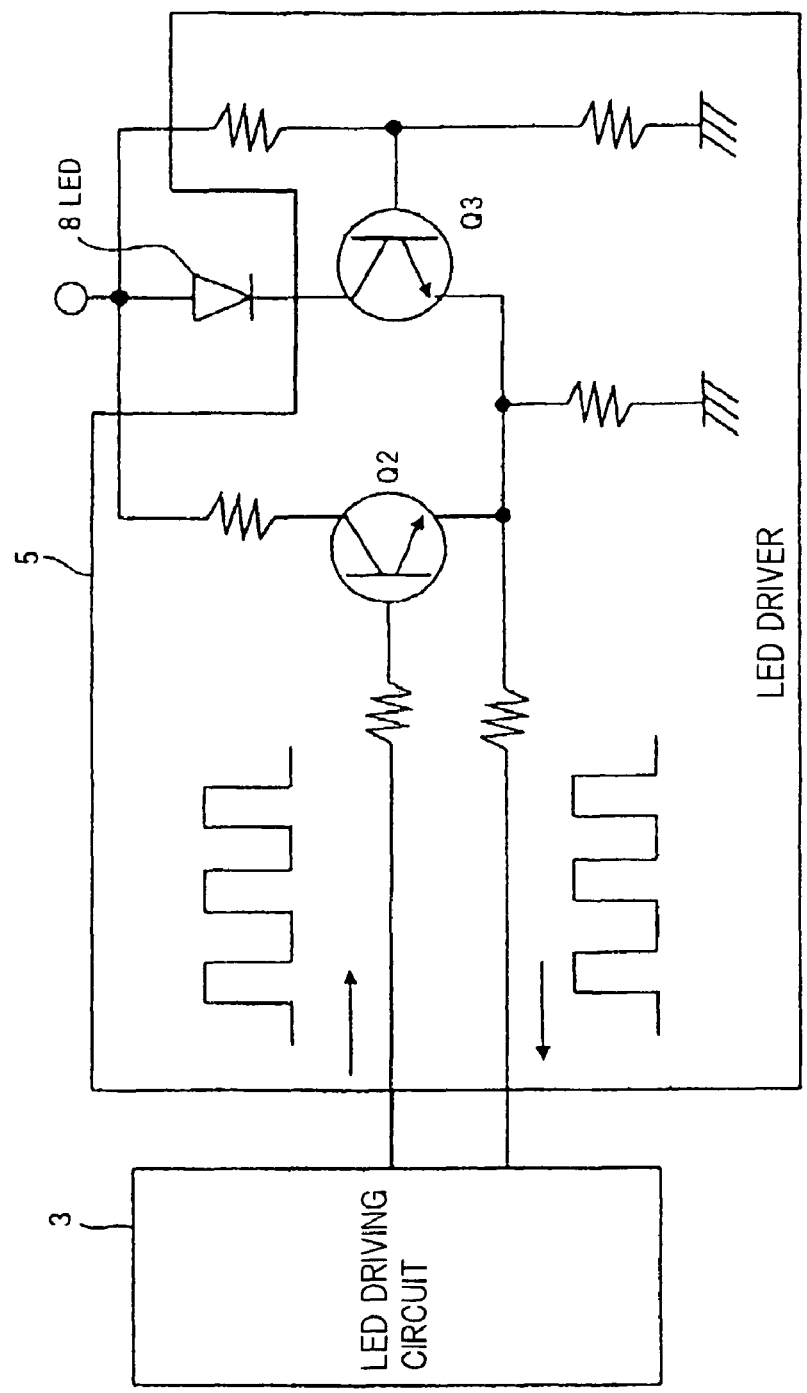

FIG. 3-5 is an example where one frame is divided into six sub-frames, images corresponding to respective colors of one frame are displayed on liquid crystal panel 13 in the order of yellow (Y), blue (B), magenta (M), green (G), red (R), and cyan (C) in the six sub-frames, and the LEDs corresponding to the colors on the displayed images are sequentially lit to display a color image. The illumination of magenta (M) is achieved by simultaneously lighting LEDs 8, 10 of red (R) and blue (B), and combining the illumination light with cross dichroic prism 12.

FIG. 3-6 is an example where one frame is divided into six sub-frames, images corresponding to respective colors of one frame are displayed on liquid crystal panel 13 in the order of yellow (Y), blue (B), white (W, clear), green (G), red (R), and cyan (C) in the six sub-frames, and the LEDs corresponding to the colors on the displayed images are sequentially lit to display a color image.

The exemplary operations shown in FIGS. 3-1 to 3-6 involve lighting an LED simultaneously with the start of image data writing in a current sub-frame, gradually increase the luminance of the LED such that an optimal luminance is reached in accordance with a gradation level of a displayed image at the time a corresponding panel video writing period ends, start decreasing the luminance of the LED simultaneously with the start of image data writing in the next sub-frame, and gradually decrease the luminance such that the LED is extinguished at the time a corresponding panel video writing period ends.

The video display device of this embodiment need not light an LED corresponding to a current sub-frame simultaneously with the start of image data writing in the current sub-frame, but may start lighting the LED at an arbitrary timing within the panel video writing period of the current sub-frame. Additionally, the video display device of this embodiment need not extinguish an LED of a color corresponding to a displayed image of the current frame at the time a panel video writing period ends in the next sub-frame, but may extinguish the LED at an arbitrary timing within the panel video writing period of the next sub-frame.

FIG. 3-7 shows an exemplary operation which involves starting lighting each LED at an arbitrary timing within a panel video writing period of a current sub-frame, and extinguishing the LED at an arbitrary timing within a panel video writing period of the next sub-frame. FIG. 3-7 also shows an example where one frame is divided into three sub-frames, an image corresponding to each color of one frame is displayed on liquid crystal panel 13 in the order of red (R), green (G), and blue (B) in the three sub-frames, and LEDs corresponding to the colors of an image to be displayed are sequentially lit to display a color image.

In the example shown in FIG. 3-7, image data of red (R) is written into liquid crystal panel 13 by liquid crystal driving circuit 4 in the first sub-frame of one frame, and after the lapse of a predetermined time from the start of the image data writing, LED driving circuit 3 lights red (R) LED 8, and gradually increases the luminance of red (R) LED 8 such that an optimal luminance (predetermined value) is reached in accordance with a gradation level of a displayed image at the time that a panel video writing period ends. On the other hand, for extinguishing red (R) LED 8, LED driving circuit 3 starts decreasing the luminance of red (R) LED 8 simultaneously with the start of image data writing in the next sub-frame (second sub-frame), and gradually decreases the luminance such that red (R) LED 8 is extinguished after the lapse of a predetermined time from the start of the image data writing (however, before the end of a panel video writing period of the next sub-frame).

Similarly, image data of green (G) is written into liquid crystal panel 13 by liquid crystal driving circuit 4 in the second sub-frame of the one frame, and after the lapse of a predetermined time from the start of the image data writing, LED driving circuit 3 lights green (G) LED 9, and gradually increases the luminance of green (G) LED 9 such that an optimal luminance (predetermined value) is reached in accordance with a gradation level of a displayed image at the time that a panel video writing period ends. On the other hand, for extinguishing green (G) LED 9, LED driving circuit 3 starts decreasing the luminance of green (G) LED 9 simultaneously with the start of image data writing in the next sub-frame (third sub-frame), and gradually decreases the luminance such that green (G) LED 9 is extinguished after the lapse of a predetermined time from the start of the image data writing (however, before the end of a panel video writing period of the next sub-frame).

Further, image data of blue (B) is written into liquid crystal panel 13 by liquid crystal driving circuit 4 in the third sub-frame of the one frame, and after the lapse of a predetermined time from the start of the image data writing, LED driving circuit 3 lights blue (B) LED 10, and gradually increases the luminance of blue (B) LED 10 such that an optimal luminance (predetermined value) is reached in accordance with a gradation level of a displayed image at the time a panel video writing period ends. On the other hand, for extinguishing blue (B) LED 10, LED driving circuit 3 starts decreasing the luminance of blue (B) LED 10 simultaneously with the start of image data writing in the next sub-frame (first sub-frame in the next frame), and gradually decreases the luminance such that blue (B) LED 10 is extinguished after the lapse of a predetermined time from the start of the image data writing (however, before the end of a panel video writing period of the next sub-frame).

As shown in FIGS. 3-1 to 3-7, the video display device of this embodiment gradually increases the luminance of a light sources (LED) of a color corresponding to an image displayed on liquid crystal panel 13 from zero to a predetermined value within a panel video writing period of a current sub-frame, and gradually decreases the luminance of the light source of the color corresponding to the displayed image of the current sub-frame from the predetermined value to zero within a panel video writing period of the next sub-frame. Thus, liquid crystal panel 13 is irradiated with illuminations of colors irradiated in adjacent sub-frames or in a composite color of them in each panel video writing period. Consequently, the video display device of this embodiment can provide a similar benefit to that which is provided when sub-frames corresponding to colors irradiated in adjacent sub-frames or a mixed color comprised of two colors or more are inserted between the sub-frames.

Accordingly, the color breakup of an image projected onto screen 15 or the like for display is improved, even if a display panel suffers a low response speed so that one frame can only be divided, for example, into three sub-frames.

Further, in the video display device of this embodiment, since a plurality of LEDs remain lit even during a panel video writing period, the luminance of an image projected on screen 15 or the like for display is improved. Such a benefit becomes larger as one frame is made up of a larger number of sub-frames.

FIGS. 4 and 5 are circuit diagrams showing exemplary configurations of the LED driving circuit and LED driver which form part of the video display device of this embodiment. Notably, in regard to the LED drivers, FIGS. 4 and 5 only show exemplary configurations of LED driver 5 for driving red (R) LED 8 shown in FIG. 1. LED driver 6 for driving green (G) LED 9 and LED driver 7 for driving blue (B) LED 10 can also employ a configuration similar to those shown in FIGS. 4 and 5.

FIG. 4 shows a configuration which comprises LED driving circuit 3 including D/A converter 31, and LED driver 5 including operational amplifier IC1 and transistor Q1 for supplying a current to LED 8.

In the configuration shown in FIG. 4, a current flowing through LED 8 is controlled by operational amplifier IC1 to be proportional to an input signal. Accordingly, LED driving circuit 3 may control a driving signal supplied to operational amplifier IC1 such that the luminance of LED 8 is gradually increased from zero to a predetermined value within a panel video writing period of a current sub-frame, and the luminance of LED 8 is gradually decreased from the predetermined value to zero within a panel video writing period of the next sub-frame.

FIG. 5 in turn shows a configuration which comprises LED driver 5 including two transistors Q2, W3 having emitters connected in common. Transistor Q3 has a base which is supplied with a constant voltage generated by dividing a supply voltage with two resistors. Transistor Q2 in turn has a base which is supplied with a pulsed driving signal from LED driving circuit 3. In this regard, the pulsed driving signal supplied to the base of transistor Q2 is fed back to LED driving circuit 3 from an emitter of transistor Q2.

In the configuration as shown in FIG. 5, the current flowing through LED 8 is proportional to the duty ratio of the pulsed driving signal output from LED driving circuit 3. Specifically, a larger current flows through LED 8 as the ratio of a high (High) level duration to a low (Low) level duration is higher. Accordingly, LED driving circuit 3 may control the duty ratio of the pulsed driving signal such that the luminance of LED 8 is gradually increased from zero to the predetermined value within a panel video writing period of a current sub-frame, and the luminance of LED 8 is gradually decreased from the predetermined value to zero within a panel video writing period of the next sub-frame.

LED driving circuit 3 shown in FIGS. 4 and 5 can be implemented by combining D/A converter 31 shown in FIG. 4, and a CPU or DSP which operates in accordance with a program, or a variety of logic circuits.

LED driving circuit 3 and LED driver 5 are not limited to the configurations shown in FIGS. 4 and 5, but may have any configuration as long as they can gradually increase the luminance of LED 8 from zero to a predetermined value within a panel video writing period of a current sub-frame, and as long as they can gradually decrease the luminance of LED 8 from the predetermined value to zero in a panel video writing period of the next sub-frame, as described above.

Notably, while the foregoing description has been given in connection with an exemplary video display device which employs transmission type liquid crystal panel 13 as a display panel, the video display device of the present invention can also be applied to a configuration which employs a known DMD as a display panel, or to a configuration which employs a known reflection type liquid crystal display such as LCOS (Liquid crystal on silicon).

Further, the present invention can also be applied to a direct-view type liquid crystal display device which comprises LEDs of red (R), green (G), and blue (B) spread all over the back side of a liquid crystal panel, or a direct-view type liquid crystal display device which comprises LEDs of red (R), green (G), and blue(B) disposed on a side surface of a liquid crystal panel and diffuser plates disposed on the back side of the liquid crystal panel.

Also, while the foregoing description has shown an example which employs LEDs as light sources for irradiating a display panel with the light of respective colors required to display a color video, the video display device of this embodiment may employ a laser oscillator for outputting laser light as a light source.

While the present invention has been described with reference to one embodiment, the present invention is not limited to the foregoing embodiment. The present invention can be modified in configuration and details in various manners which can be understood by those skilled in the art within the scope of the present invention.

This application claims the priority based on Japanese Patent Application No. 2007-260832 filed Oct. 4, 2007, the disclosure of which is incorporated herein by reference in its entirety.

The invention claimed is:

1. A video display device that uses field sequential color scheme, said video display device comprising:
- a plurality of light sources for emitting light of a plurality of colors required to display a color video;
- a display panel for sequentially displaying a plurality of images corresponding to the colors in a plurality of sub-frames which make up one frame based on a video signal;
- a light source driving circuit for generating a driving signal for lighting a light source of a color corresponding to a displayed image on a per-sub-frame basis, so as to gradually increase the luminance of the light source of the light corresponding to the displayed image of a current sub-frame from zero to a predetermined value within a panel video writing period of the current sub-frame, where the panel video writing period defines a period from the start of image data writing into said display panel to the completion of displaying an image based on the image data in the sub-frame, and so as to gradually decrease the luminance of the light source of the color corresponding to the displayed image of the current sub-frame from the predetermined value to zero within the panel video writing period of the next sub-frame;
- a light source driver for driving said light sources to emit light in accordance with the driving signal;
- wherein said light source driving circuit:
- starts lighting the light source of the color corresponding to the displayed image of the current sub-frame simultaneously with the start of the image data writing in the current sub-frame, and gradually increases the luminance of the light source such that the luminance of the light source reaches a predetermined value at the time the panel video writing period ends in the current sub-frame; and
- starts decreasing the luminance of the light source of the color corresponding to the current sub-frame simultaneously with the start of the image data writing in the next sub-frame, and gradually decreases the luminance of the light source such that the light source is extinguished at the time the panel video writing period ends in the next sub-frame.

2. The video display device according to claim 1, wherein said display panel comprises a transmission type liquid crystal panel.

3. The video display device according to claim 1, wherein said display panel comprises a DMD.

4. The video display device according to claim 1, wherein said display panel comprises a reflection type liquid crystal panel.

5. The video display device according to claim 1, wherein said light source comprises an LED.

6. The video display device according to claim 1, wherein said light source comprises a laser oscillator for emitting laser light.

7. A video display device that uses field sequential color scheme, said video display device comprising:
- a plurality of light sources for emitting light of a plurality of colors required to display a color video;
- a display panel for sequentially displaying a plurality of images corresponding to the colors in a plurality of sub-frames which make up one frame based on a video signal;
- a light source driving circuit for generating a driving signal for lighting a light source of a color corresponding to a displayed image on a per-sub-frame basis, so as to gradually increase the luminance of the light source of the light corresponding to the displayed image of a current sub-frame from zero to a predetermined value within a panel video writing period of the current sub-frame, where the panel video writing period defines a period from the start of image data writing into said display panel to the completion of displaying an image based on the image data in the sub-frame, and so as to gradually decrease the luminance of the light source of the color corresponding to the displayed image of the current sub-frame from the predetermined value to zero within the panel video writing period of the next sub-frame;
- a light source driver for driving said light sources to emit light in accordance with the driving signal;
- starts lighting the light source of the color corresponding to the displayed image of the current sub-frame after the lapse of a predetermined time from the start of the image data writing in the current sub-frame, and gradually increases the luminance of the light source such that the luminance of the light source reaches a predetermined value at the time the panel video writing period ends in the current sub-frame; and
- starts decreasing the luminance of the light source of the color corresponding to the current sub-frame simultaneously with the start of the image data writing in the next sub-frame, and gradually decreases the luminance of the light source such that the light source is extinguished before the panel video writing period ends in the next sub-frame and after the lapse of a predetermined time from the start of the decrease of the luminance of the light source.

8. A light source driving method for driving light sources to emit light in a video display device using a field sequential color scheme, said video display device comprising:
- a plurality of the light sources for emitting light of a plurality of colors required to display a color video;
- a display panel for sequentially displaying a plurality of images corresponding to the colors in a plurality of sub-frames which make up one frame based on a video signal;
- a light source driving circuit for generating a driving signal for lighting a light source of a color corresponding to a displayed image on a per-sub-frame basis; and
- a light source driver for driving said light sources to emit light in accordance with the driving signal,
- wherein when a panel video writing period defines a period from the start of image data writing into said display panel to the completion of an image display based on the image data,
- said light source driving circuit generates a driving signal for gradually increasing the luminance of a light source of a color corresponding to a displayed image of a current sub-frame from zero to a predetermined value within the panel video writing period of the current sub-frame, and for gradually decreasing the luminance of the light source of the color corresponding to the displayed image of the current sub-frame from the predetermined value to zero within the panel video writing period of the next sub-frame; and
- said light source driver drives said light source to emit light in accordance with the driving signal,
- wherein said light source driving circuit generates a driving signal for:
- starting lighting the light source of the color corresponding to the displayed image of the current sub-frame simultaneously with the start of the image data writing in the current sub-frame, and for gradually increasing the luminance of the light source such that the luminance of the light source reaches a predetermined value at the time the panel video writing period ends in the current sub-frame; and starting decreasing the luminance of the light source of the color corresponding to the current sub-frame simultaneously with the start of the image data writing in the next sub-frame, and for gradually decreasing the luminance of the light source such that the light source is extinguished at the time the panel video writing period ends in the next sub-frame.

9. A light source driving method for driving light sources to emit light in a video display device using a field sequential color scheme, said video display device comprising:

a plurality of the light sources for emitting light of a plurality of colors required to display a color video;

a display panel for sequentially displaying a plurality of images corresponding to the colors in a plurality of sub-frames which make up one frame based on a video signal;

a light source driving circuit for generating a driving signal for lighting a light source of a color corresponding to a displayed image on a per-sub-frame basis; and a light source driver for driving said light sources to emit light in accordance with the driving signal, wherein when a panel video writing period defines a period from the start of image data writing into said display panel to the completion of an image display based on the image data, said light source driving circuit generates a driving signal for gradually increasing the luminance of a light source of a color corresponding to a displayed image of a current sub-frame from zero to a predetermined value within the panel video writing period of the current sub-frame, and for gradually decreasing the luminance of the light source of the color corresponding to the displayed image of the current sub-frame from the predetermined value to zero within the panel video writing period of the next sub-frame; and said light source driver drives said light source to emit light in accordance with the driving signal, wherein said light source driving circuit generates a driving signal for:

starting lighting the light source of the color corresponding to the displayed image of the current sub-frame after the lapse of a predetermined time from the start of the image data writing in the current sub-frame, and for gradually increasing the luminance of the light source such that the luminance of the light source reaches a predetermined value at the time the panel video writing period ends in the current sub-frame; and starting decreasing the luminance of the light source of the color corresponding to the current sub-frame simultaneously with the start of the image data writing in the next sub-frame, and gradually decreasing the luminance of the light source such that the light source is extinguished before the panel video writing period ends in the next sub-frame and after the lapse of a predetermined time from the start of the decrease of the luminance of the light source.

* * * * *